United States Patent
Peña Valcárcel

(10) Patent No.: US 10,099,815 B2
(45) Date of Patent: Oct. 16, 2018

(54) MULTI-USE CONTAINER WITH WHEELS

(71) Applicant: Matrival, S.L., Beniparrell (ES)

(72) Inventor: Felipe Peña Valcárcel, Beniparrell (ES)

(73) Assignee: Matrival, S.L., Valencia (ES)

( * ) Notice: Subject to any disclaimer, the term of this patent is extended or adjusted under 35 U.S.C. 154(b) by 0 days.

(21) Appl. No.: 15/570,027

(22) PCT Filed: Mar. 16, 2016

(86) PCT No.: PCT/ES2016/070175
§ 371 (c)(1),
(2) Date: Oct. 27, 2017

(87) PCT Pub. No.: WO2016/174285
PCT Pub. Date: Nov. 3, 2016

(65) Prior Publication Data
US 2018/0162592 A1    Jun. 14, 2018

(30) Foreign Application Priority Data
Apr. 28, 2015   (ES) ............................... 201530481 U

(51) Int. Cl.
*B65D 21/02* (2006.01)
*B65D 43/02* (2006.01)
*B25H 5/00* (2006.01)

(52) U.S. Cl.
CPC ..... *B65D 21/0212* (2013.01); *B65D 43/0204* (2013.01); *B25H 5/00* (2013.01); *B65D 2543/00194* (2013.01)

(58) Field of Classification Search
CPC ............ B65D 21/0212; B65D 21/0213; B65D 21/0215; B65D 21/0216; B65D 43/0204; B65D 2543/00194; B25H 5/00
USPC .................................. 280/33.998, 79.11, 79.2
See application file for complete search history.

(56) References Cited

U.S. PATENT DOCUMENTS

| | | | | |
|---|---|---|---|---|
| 5,186,330 A  * | 2/1993 | McClure | ................... | B62B 3/16 |
| | | | | 206/508 |
| 5,709,008 A | 1/1998 | Dickinson | | |
| 5,785,328 A  * | 7/1998 | Eckloff | ...................... | B62B 3/16 |
| | | | | 206/821 |
| 8,157,094 B2 * | 4/2012 | Schiessl | ............. | B65D 21/0212 |
| | | | | 206/457 |
| 2011/0186458 A1 | 8/2011 | Schiessl | | |

FOREIGN PATENT DOCUMENTS

CN             203186682 U        9/2013

OTHER PUBLICATIONS

Dea Home, IMBO-195, webpage, Aug. 2, 2013, Castelbellino, Italy.

* cited by examiner

*Primary Examiner* — John D Walters
(74) *Attorney, Agent, or Firm* — The Webb Law Firm

(57) ABSTRACT

A multi-use container with wheels, which includes: an opening; a base; lateral walls; end faces; a lower edge around the lateral walls and the end faces; at least two wheels coupled to each external face of the lateral walls, close to the lower edge of the lateral walls and the lower corners of the container; and recesses in the opening for receiving a lower part of the wheels of a container stacked on top. The base projects from underneath the lower edge.

15 Claims, 6 Drawing Sheets

MULTI-USE CONTAINER WITH WHEELS

CROSS-REFERENCE TO RELATED APPLICATIONS

This application is the United States national phase of International Application No. PCT/ES2016/070175 filed Mar. 16, 2016, and claims priority to Spanish Utility Model Application No. U201530481 filed Apr. 28, 2015, the disclosures of which are hereby incorporated in their entirety by reference.

BACKGROUND OF THE INVENTION

Field of the Invention

The present invention refers to a new multi-use container with wheels for several applications, preferably for transporting and distributing any type of product.

It is of particular use in the assembly lines of the automotive sector.

Description of Related Art

Nowadays, organising a company requires a series of means to carry out logistics operations, such as collecting, storing, transporting, distributing and supplying products or parts.

In the assembly lines of the automotive sector, this type of containers is required since they make it possible to supply a number of products or parts from a storage area to a workstation. For example, once these parts have been supplied to and used by the operator, the box protecting the parts can be returned in said containers so it can be reused.

Currently, shelves or transport lines are used wherein the containers are moved longitudinally along workstations thanks to rolling components in said transport lines themselves.

DESCRIPTION OF THE INVENTION

The present invention describes a multi-use container with wheels in the container itself, so that although the container includes wheels, they are perfectly integrated in the structure of the container without impairing the stacking capacity thereof, making it possible thanks to this characteristic to simplify the morphology of the transport lines.

The present invention refers to a multi-use container with wheels including an opening, a base, two lateral walls, two end faces, a lower edge around the lateral walls and the end faces, at least two rigid wheels coupled to each external face of the lateral walls, close to the lower edge of the lateral walls and to lower corners of the container, recesses in the opening for receiving a lower part of the wheels of a container stacked on top, the base projecting from underneath the lower edge, and a lid for covering the container.

Preferably, each lateral wall includes three wheels, wherein each wheel is protected by a protective skirting. These protecting skirtings also include an external face, an internal face and a central circular opening for coupling and retaining by snap-fitting a shaft of a removable pin already inserted in the wheel.

The internal face of the protective skirtings is separated from the external face of the lateral wall, defining a slot where a head of the removable pin is inserted by pressure fitting.

The lateral walls include vertical ribs arranged in line with the protective skirtings, forming a single-part, joined at one of the ends thereof to the protective skirtings closer to the end faces, and at the other end thereof to the recesses of the opening of the container.

The container includes at least one central protective skirting including one reinforcing element.

The end faces include vertical ribs joined at one of the ends thereof to the lower edge of the end faces and at the other end thereof to the opening of the container.

The container also includes extensions proximate to the opening in order to reinforce the structure of the container.

The container, the wheels and the removable pin are manufactured using plastic materials.

BRIEF DESCRIPTION OF THE DRAWINGS

To complete the description and in order to give a better understanding of the characteristics of the invention, this specification is accompanied by a series of drawings that are an integral part of said specification, wherein, for illustration purposes and without limitation, the following has been represented.

Figure 1:
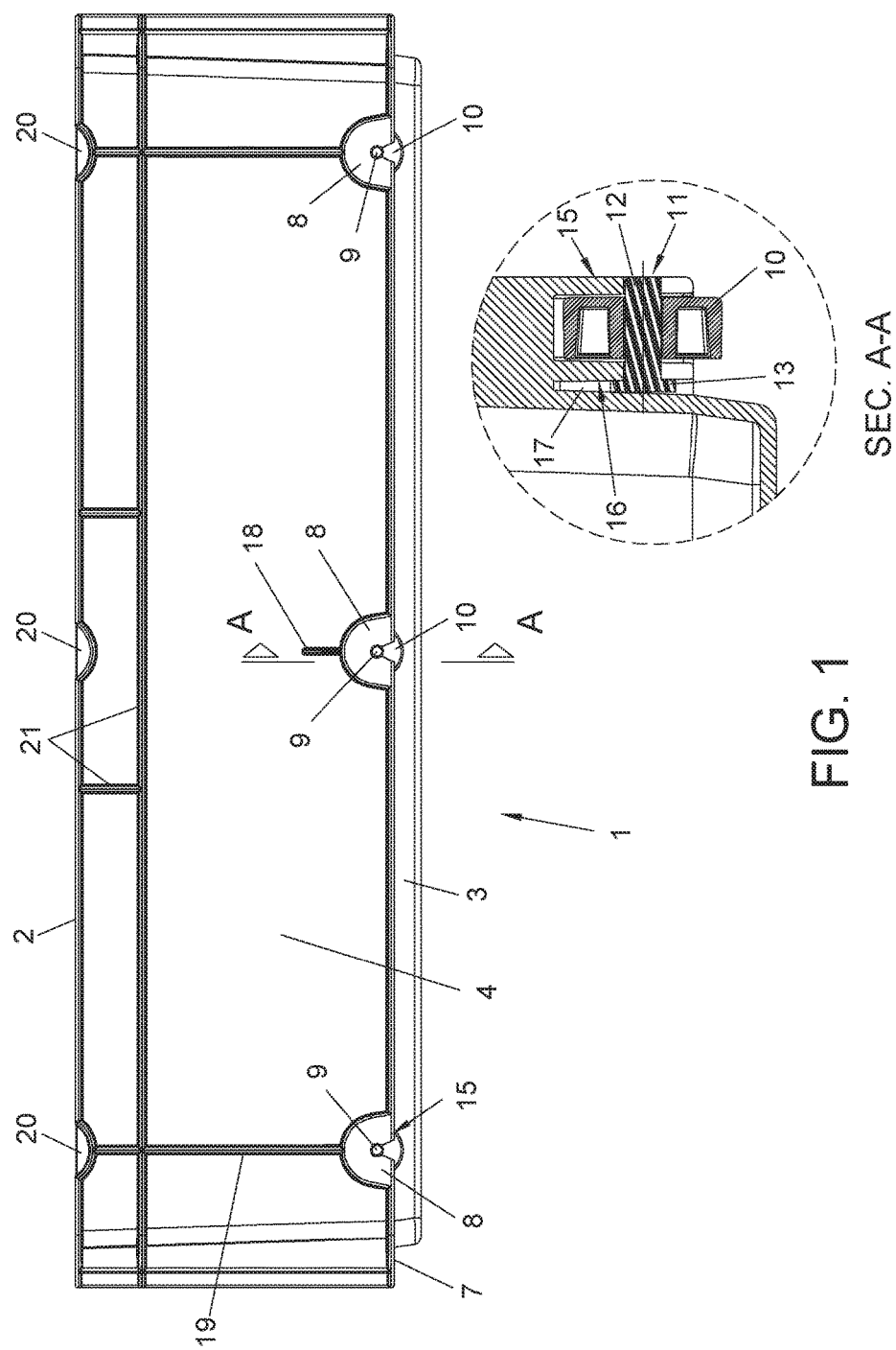
FIG. 1 shows a side view of the container displaying a section AA of one of the wheels of the lateral wall in order to show the assembly in detail.

A list of the different components that have been represented in the figures and which are included in the invention is detailed below:

1. Multi-use container with wheels
2. Opening.
3. Base.
4. Lateral wall.
5. End face.
6. Lid.
7. Lower edge.
8. Protective skirting.
9. Central circular opening.
10. Wheel.
11. Removable pin.
12. Shaft.
13. Head.
14. Guides.
15. External face of the protective skirting.
16. Internal face of the protective skirting.
17. Slot.
18. Reinforcing element.
19. Vertical rib.
20. Recess.
21. Extension.

DETAILED DESCRIPTION

The multi-use container with wheels (1) that is the disclosure makes it possible to collect, store, transport, distribute and supply any product, preferably component parts. The wheels (10) included in the container allow it to be used in the commonly known dynamic shelves or guides (14), with the particularity that the wheels (10) are fitted in the container itself, instead of the shelves or guides (14), thus making it possible to use shelves or guides (14) including a simple flat profile.

This new design allows users to easily transport the container (1), applying the minimum effort required on any part of the container (1). Once the product has been placed inside the container (1), the container can be closed by means of the corresponding lid (6), perfectly closing the container (1) and securing the product inside.

The container (1) that is the object of the disclosure includes an opening (2), a base (3), lateral walls (4), two end faces (5), a lower edge (7) around the lateral walls (4) and the end faces (5), and at least two wheels (10) coupled to each external face of the lateral walls (4), close to the lower edge (7) of the lateral walls (4) and the lower corners of the container (1), wherein the base (3), which is preferably rectangular, projects from underneath said lower edge (7) since, as mentioned above, this type of container (1) is used for rolling over guides (14) with flat profiles. In addition, it includes a lid (6) for covering the container (1).

According to one embodiment of the disclosure, each lateral wall (4) includes three wheels (10) where each wheel (10) is protected by a protective skirting (8). The protective skirtings (8), as shown on FIG. 1, include an external face (15), an internal face (16), and a central circular opening (9) where the shaft (12) of a removable pin (11), with the wheel (10) inserted in, is coupled and retained by snap-fitting.

Figure 4:
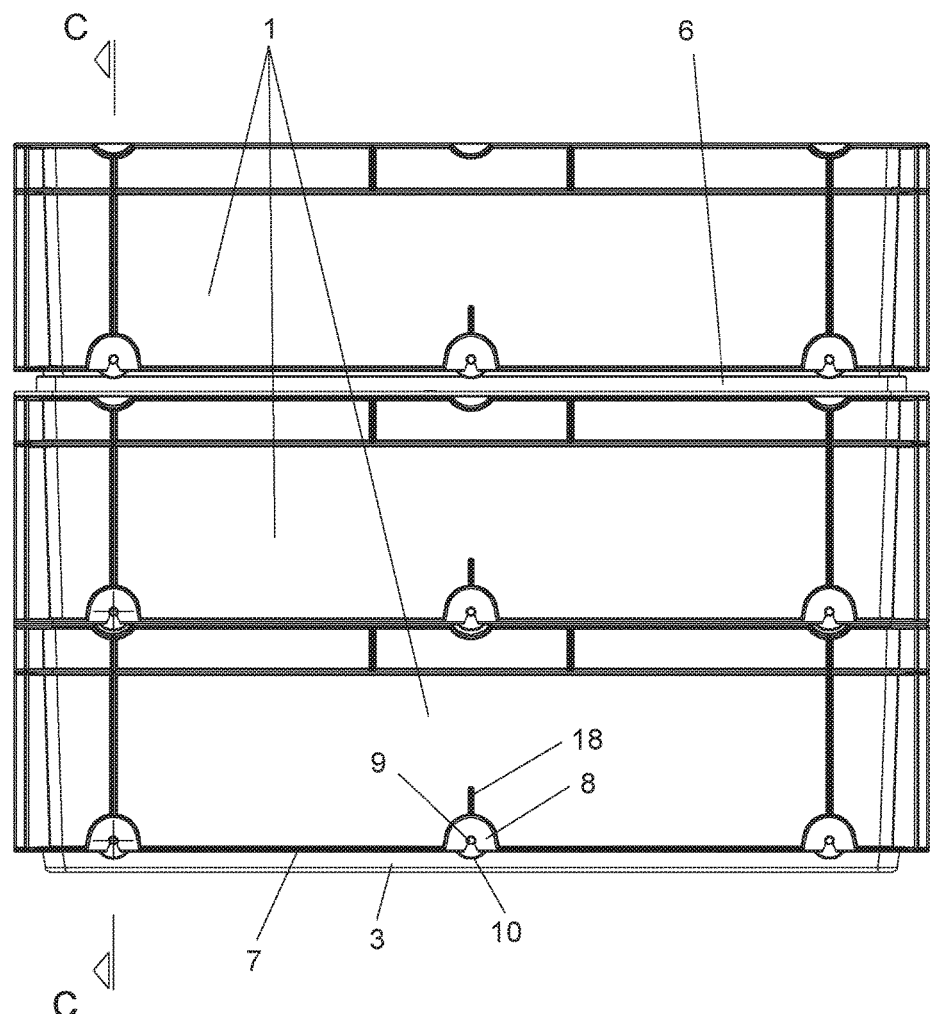
FIG. 4 shows a view of several stacked containers. The second container incorporates the lid, and said lid is supporting the base of the first container. The second container is stacked directly on the third container, fitting the lower part of the wheels of this second container in the recesses of the opening of the third container.

In order to make it possible to stack up the containers (1), the container (1) includes recesses (20) in the opening (2) thereof in order to fit the lower part of the wheels (10) of a container (1) stacked on top, as shown on FIG. 4. Said FIG. 4 shows two different ways of stacking them up, displaying firstly how the second container incorporates the lid (6) and how said lid (6) supports the base (3) of the first container, and secondly how the second container is stacked directly on top of the third container, fitting the lower part of the wheels of this container in the recesses (20) of the opening (2) of the third container.

The lateral walls (4) of the container (1) include vertical ribs (19) joined at one of the ends thereof to the protective skirtings (8) closer to the end faces (5) and at the other end thereof to the recesses (20) of the opening (2) of the container (1), increasing the rigidity of said protective skirtings (8) and increasing the protection provided to the wheels (10).

Preferably, said vertical ribs (19) are arranged in line with the protective skirtings (8), forming a single-part. Therefore, the width of the vertical ribs (19) is the same width as that of the protective skirtings (8).

In addition, the end faces (5) also include vertical ribs (19) joined at one of the ends thereof to the lower edge (7) of the end faces (5) and at the other end thereof to the opening (2) of the container (1), reinforcing the structure of the container (1).

Additionally, the at least one central protective skirting (8) includes a reinforcing element (18).

Figure 5:
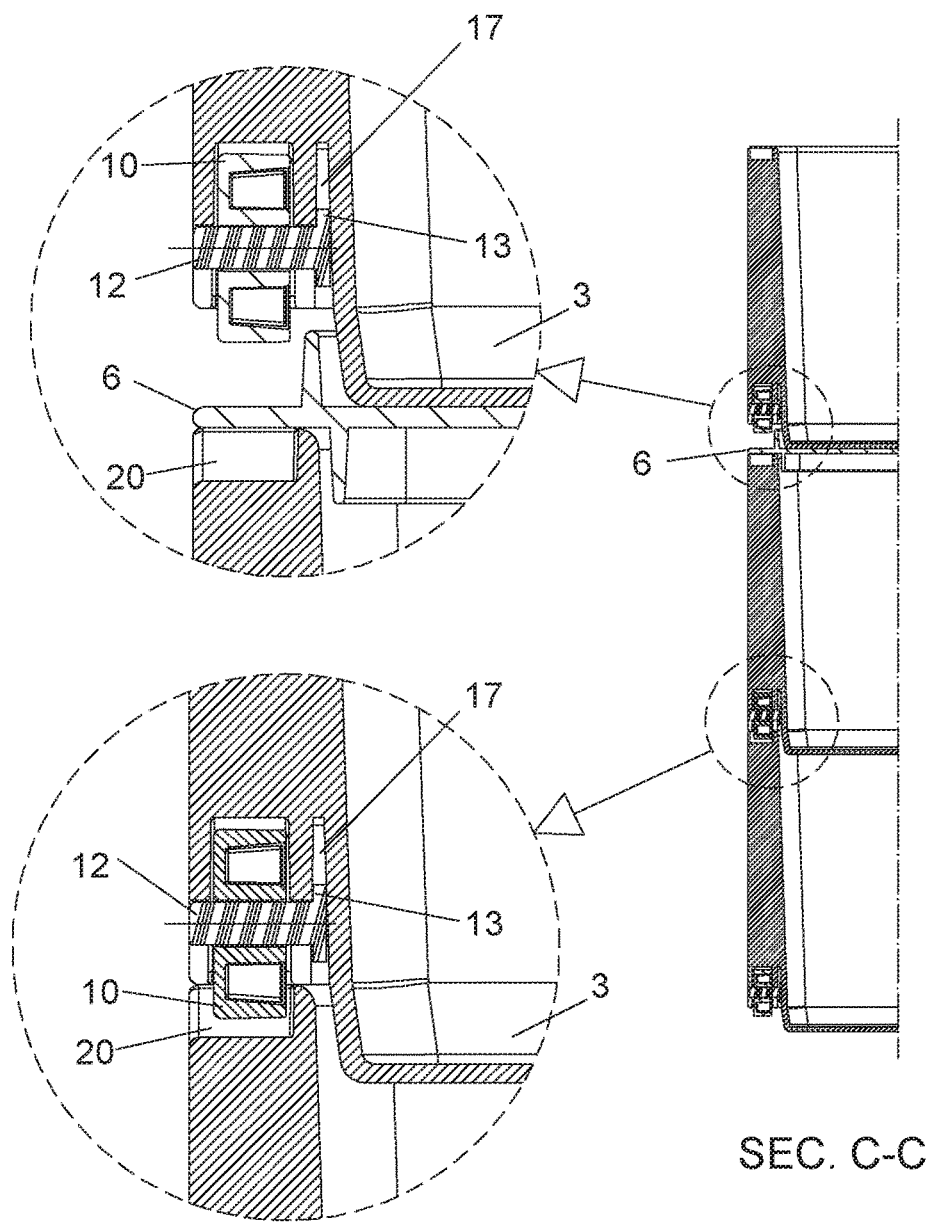
FIG. 5 shows a detailed view of the section CC of FIG. 4.
Figure 6:
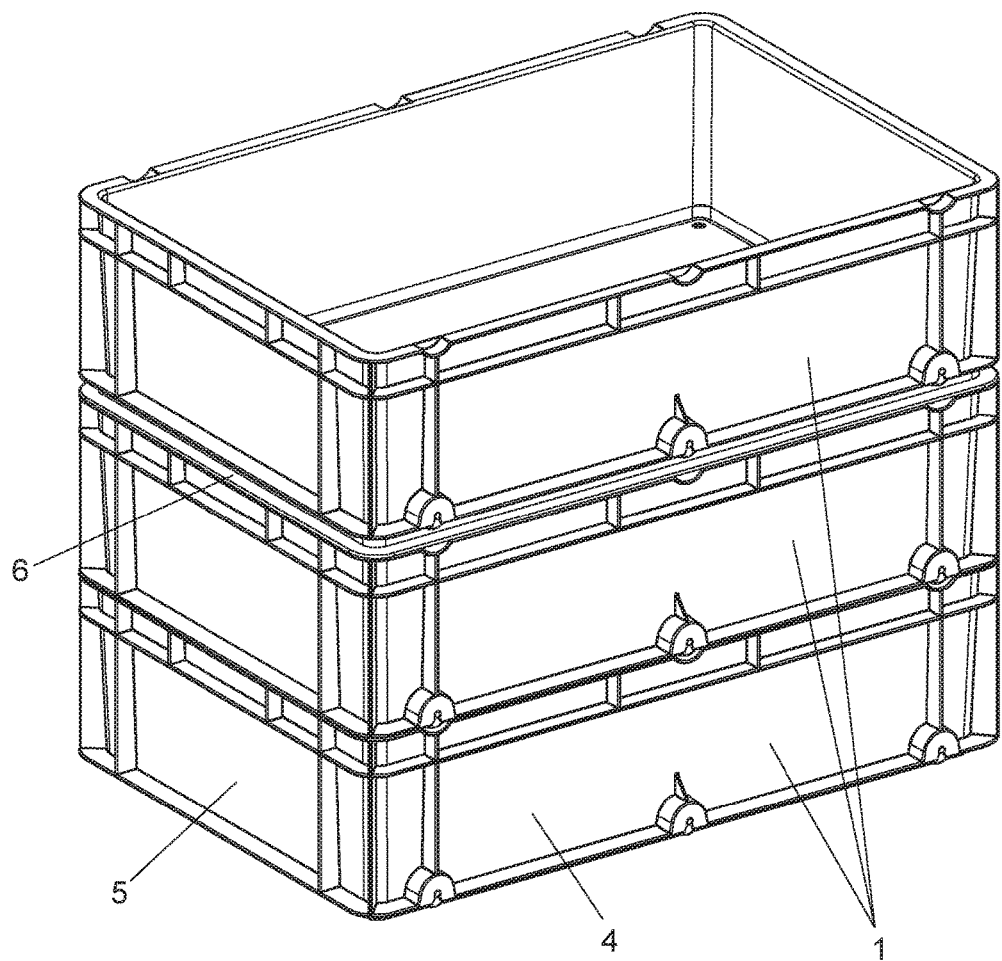
FIG. 6 shows a perspective view of the stacked containers of FIG. 4.

Both the external face (15) and the internal face (16) of the protective skirtings (8) are shown on FIGS. 1 and 5, which display how the internal face (16) of the protective skirtings (8) is slightly separated from the external face of the lateral wall (4) in the way of a fork, defining a small slot (17) where the head of the (13) removable pin (11) is inserted by pressure fitting.

Due to this small slot (17) that operates as a means for securing the head (13) of the removable pin (11), and to the central circular opening (9) of the protective skirtings (8) that secures the shaft (12) of the removable pin (11), the wheels (10) are firmly secured to the structure of the container (1). It is also contemplated that other configurations of wheels may be used.

As shown above, coupling the wheels (10) is done easily and simply. In addition, the wheels (10) are very light and rigid so that they reduce the weight of the container (1).

If the wheels (10) were to break, replacing them is very simple since it is only necessary to remove the wheels (10) by decoupling them by means of pressure. This reduces the manufacturing costs.

Figure 2:
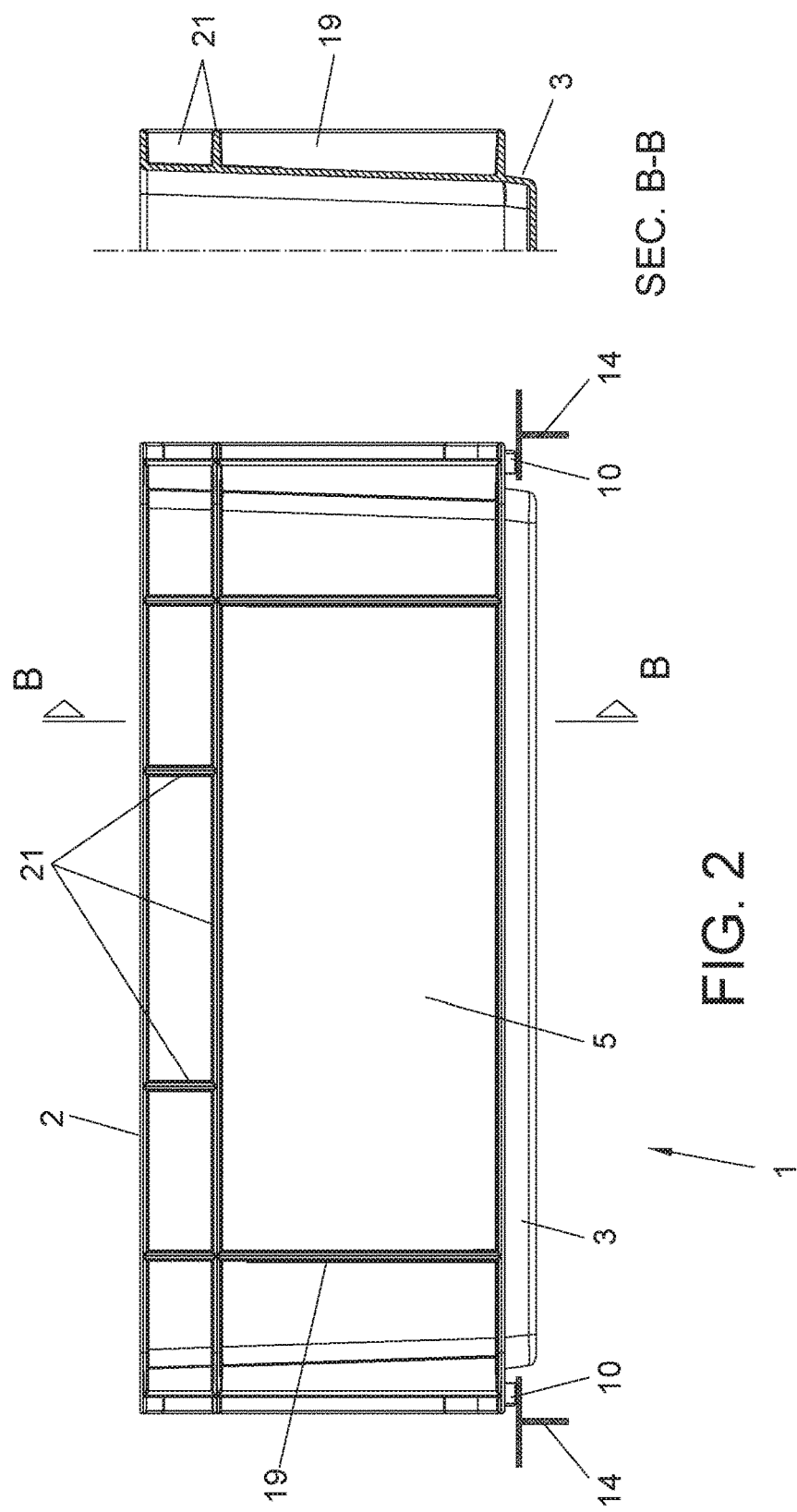
FIG. 2 shows a front view of the container displaying a section BB of one of the end faces. It also shows how the container is mounted over guides.
Figure 3:
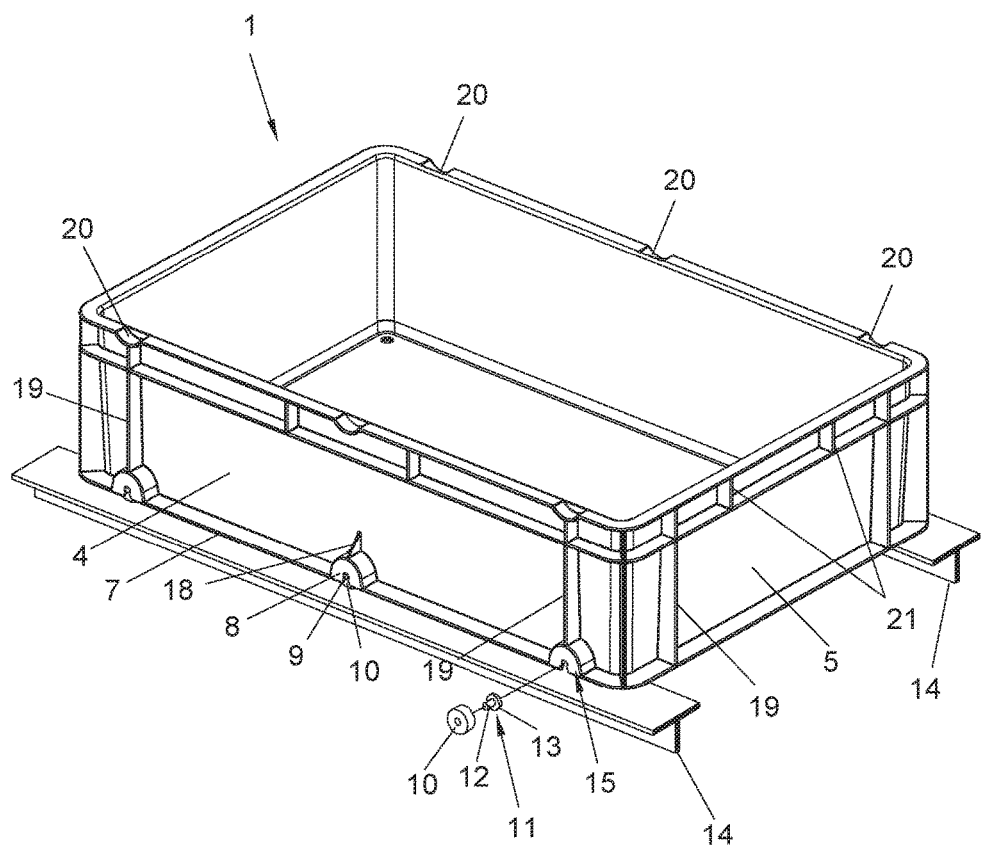
FIG. 3 shows a perspective view of the container mounted over guides.

FIGS. 2 and 3 show how the containers (1) rest over the guides (14) with flat profiles.

The container (1) has several sizes, which are adapted to the standard dimensions commonly used for transporting goods that are placed in pallets, and it may include handles to make it easier to transport.

In addition, the corners of the container (1) are chamfered.

The present disclosure is not limited by the embodiment disclosed herein. Other embodiments can be made by persons skilled in the art in light of this description. In consequence, the scope of the invention is defined by the following claims.

The invention claimed is:

1. A multi-use container, comprising:
an opening, a base, lateral walls, end faces,
a lower edge around the lateral walls and the end faces,
at least two wheels coupled to each external face of the lateral walls, close to the lower edge of the lateral walls and lower corners of the container, and
recesses in the opening for receiving a lower part of the wheels of a second container stacked on top of the multi-use container, the base projecting from underneath the lower edge.

2. The multi-use container according to claim 1, wherein each lateral wall comprises three wheels.

3. The multi-use container according to claim 1, wherein each wheel is protected by a protective skirting.

4. The multi-use container according to claim 3, wherein the protective skirtings comprise an external face, an internal face and a central circular opening for coupling and retaining by a shaft of a removable pin by snap-fitting with the wheel inserted.

5. The multi-use container according to claim 4, wherein the container, the wheels and the removable pin are manufactured using plastic materials.

6. The multi-use container according to claim 4, wherein the shaft of the removable pin within the inserted wheel is configured to be coupled to the central circular opening by snap-fitting.

7. The multi-use container according to claim 6, wherein the lateral walls comprise vertical ribs joined at one end thereof to the protective skirtings closer to the end faces, and at an opposing end thereof to the recesses of the opening of the container.

8. The multi-use container according to claim 7, wherein the vertical ribs are arranged in line with the protective skirting, forming a single-part.

9. The multi-use container according to claim 8, further comprising at least one central protective skirting comprising a reinforcing element.

10. The multi-use container according to claim 9, wherein the end faces comprise vertical ribs joined at one end thereof to the lower edge of the end faces, and at an opposing end thereof to the opening of the container.

11. The multi-use container according to claim 10, wherein the internal face of the protective skirtings is separated from the external face of the lateral wall, defining a slot in which a head of the removable pin is inserted by pressure fitting.

12. The multi-use container according to claim 1, wherein the lateral walls comprise two lateral walls and the end faces comprise two end faces.

13. The multi-use container according to claim 1, wherein the wheels are rigid.

14. The multi-use container according to claim 1, further comprising a lid for covering the container.

15. The multi-use container according to claim 1, further comprising extensions proximate to the opening in order to reinforce a structure of the container.

* * * * *

UNITED STATES PATENT AND TRADEMARK OFFICE
CERTIFICATE OF CORRECTION

PATENT NO. : 10,099,815 B2
APPLICATION NO. : 15/570027
DATED : October 16, 2018
INVENTOR(S) : Felipe Peña Valcárcel It is certified that error appears in the above-identified patent and that said Letters Patent is hereby corrected as shown below:

In the Claims

Column 4, Line 46, Claim 4, after "retaining" delete "by"

Signed and Sealed this
Twenty-ninth Day of January, 2019

Andrei Iancu
*Director of the United States Patent and Trademark Office*